(12) United States Patent
Persson et al.

(10) Patent No.: US 8,591,687 B2
(45) Date of Patent: Nov. 26, 2013

(54) LAMINATION STATION FOR LAMINATING A PAPERBOARD OR CARDBOARD WEB

(75) Inventors: Åke Persson, Furulund (SE); Katarina Jonasson, Bjärred (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 151 days.

(21) Appl. No.: 12/921,085

(22) PCT Filed: Feb. 19, 2009

(86) PCT No.: PCT/SE2009/000093
§ 371 (c)(1),
(2), (4) Date: Oct. 20, 2010

(87) PCT Pub. No.: WO2009/110825
PCT Pub. Date: Sep. 11, 2009

(65) Prior Publication Data
US 2011/0041981 A1    Feb. 24, 2011

(30) Foreign Application Priority Data
Mar. 6, 2008 (SE) ...................... 0800516

(51) Int. Cl.
*B32B 37/00* (2006.01)

(52) U.S. Cl.
USPC ...... 156/244.11; 156/498; 156/500; 156/555; 156/582

(58) Field of Classification Search
USPC ............ 156/228, 242, 244.11, 498, 500, 555, 156/580, 582, 583.1
See application file for complete search history.

(56) References Cited

U.S. PATENT DOCUMENTS

| 4,481,876 A * | 11/1984 | Amendola ...................... 100/38 |
| 5,849,128 A * | 12/1998 | Kobinata et al. ......... 156/244.11 |
| 7,008,496 B2 * | 3/2006 | Morman ....................... 156/167 |
| 2004/0163769 A1 * | 8/2004 | Kegasawa et al. ............ 156/497 |
| 2005/0180787 A1 * | 8/2005 | Nami et al. ................... 399/328 |
| 2009/0080954 A1 * | 3/2009 | Miyata et al. ................ 399/329 |

FOREIGN PATENT DOCUMENTS

| DE | 10343215 A1 | 4/2005 |
| EP | 1345756 A1 | 9/2003 |
| WO | WO 02/49833 A1 | 6/2002 |
| WO | WO 03/014470 A1 | 2/2003 |

OTHER PUBLICATIONS

International Search Report issued Jun. 11, 2009 by the Swedish Patent Office in International Application No. PCT/SE2009/000093.

* cited by examiner

*Primary Examiner* — James Sells

(74) *Attorney, Agent, or Firm* — Buchanan Ingersoll & Rooney PC

(57) ABSTRACT

A lamination station for laminating a film to a web of paperboard includes a nip roller and a cooling roller. Between the rollers there is formed a nip which presses together the film and the web of paperboard with an interjacent molten polymer layer or adhesive layer disposed between the film and the web of paperboard. The film, the paperboard and the molten polymer lie, after the nip, in abutment against the cooling roller for a certain angle interval. The nip roller is a shoe-press type roller, either comprising a pressure bar having several hydraulically operated pressure elements, or comprising one or several rigid pressure bars.

13 Claims, 2 Drawing Sheets

LAMINATION STATION FOR LAMINATING A PAPERBOARD OR CARDBOARD WEB

TECHNICAL FIELD

The present invention relates to a lamination station for laminating film to a web of paperboard or cardboard material.

BACKGROUND ART

In the lamination of packaging materials, for example for liquid packages, it is normal practice to start from a web of paperboard or cardboard, one or both sides of the web being coated with different types of films or material layers in order for the finished packaging material to attain the desired properties. Those layers which are employed for coating the paperboard or cardboard material are principally different types of plastic films, but different types of metal foils (e.g. Alifoil) may be employed. The plastic layers and the possible metal foil fulfil the purpose of preventing action between the product which is to be packed and the packaging material. Another purpose is to prevent e.g. oxygen from penetrating into the package.

Most generally, the web of paperboard or cardboard is delivered in the form of a magazine reel. The magazine reel is applied in one end of a lamination machine, which comprises a number of rollers which together form a path for the web. In order to realise the compressive force necessary for the lamination, generally two rollers are applied close to one another, so that a nip is formed between the rollers. In order to obtain a satisfactory adhesion between, for example, a plastic film and the paperboard/cardboard, the pressure in the nip should be maintained for a certain time at a given pressure. In general, it may be said that if the pressure is low, the time should be long, and vice versa.

One problem occurs if the web of paperboard or cardboard is of low density, i.e. is "fluffy"; if the intention is to maintain the low density also after the nip between the rollers, the pressure should be low (i.e. the clearance between the rollers should be large), otherwise the web will be compressed by the pressure in the nip. As was mentioned previously, the adhesion between the web and the film which is to be laminated depends upon the time during which the web is exposed to pressure as well as the pressure at which the web is exposed. If the pressure is low, the time spent in the nip should thus be long in order to reach the same level of adhesion.

There are two ways of extending the time during which a nip between two rollers subjects a web to pressure: the first method is to reduce the web speed, but from the viewpoint of production economics this is less suitable. The other possibility is to increase the diameter of the rollers, but the point is soon reached where the size of the rollers becomes unreasonable.

Moreover, the prior art lamination machines are designed for a given lamination pressure. This implies that the rollers may have a slightly convex form, which compensates for the outward flexing of the rollers, and at a certain compressive force between the rollers gives a uniform pressure throughout the entire width of the rollers. If the force between the rollers is increased or reduced, the convexity of the rollers will not correspond to the outward flexing of the rollers, for which reason the range within which it is possible to modify the compressive force between the rollers is limited.

EP 1 345 756 describes a roller comprising an inner, rigid core surrounded by two layers of resilient material. If one such roller is employed there will, granted, be a slightly longer nip, but the major reason for using such a roller is that there will be obtained a nip which is relatively insensitive to variations in the thickness of the web.

BRIEF SUMMARY OF THE INVENTION

The problem in obtaining a long press time in the nip is solved according to the present invention in that the nip roller consists of a shoe-press type pressure roller.

In order to realise adhesion between a material layer or a film and a web of paperboard or cardboard, an interjacent molten polymer layer or adhesive layer may be provided between the film and the web of paperboard.

In order to obtain superior properties relating to liquid and air tightness, the film may consist of a polymer film or an aluminium foil (Alifoil). The material layer may also be a molten polymer which is applied on the web of paperboard by means of extrusion coating.

In order to obtain the requisite length of the nip, the pressure roller includes a press web, the press web running parallel with and at the same speed as the web of paperboard, the press web being urged against the cooling roller by means of one or more pressure bars, extending along the roller, provided for this purpose.

In order to be able to regulate the compressive force during operation, the pressure bar may be an elongated member having a profile resembling a kind of "shoe", which is pressed against the press webb, normally by hydraulic pressure mechanisms acting upon the shoe-shaped member. This technology is known in the field of paper calendaring as the conventional type of shoe-press technology. Alternatively and according to more modern shoe-press technology, the pressure bar may include a battery of hydraulically activated elements for creating the pressure against the press web and the pressure profile within the nip.

One preferred application of a lamination station including a shoe press roller nip may be the manufacture of packaging materials.

BRIEF DESCRIPTION OF THE ACCOMPANYING DRAWINGS

The present invention will now be described in greater detail hereinbelow, with reference to the accompanying Drawings. In the accompanying Drawings.

DESCRIPTION OF PREFERRED EMBODIMENTS

Figure 1:
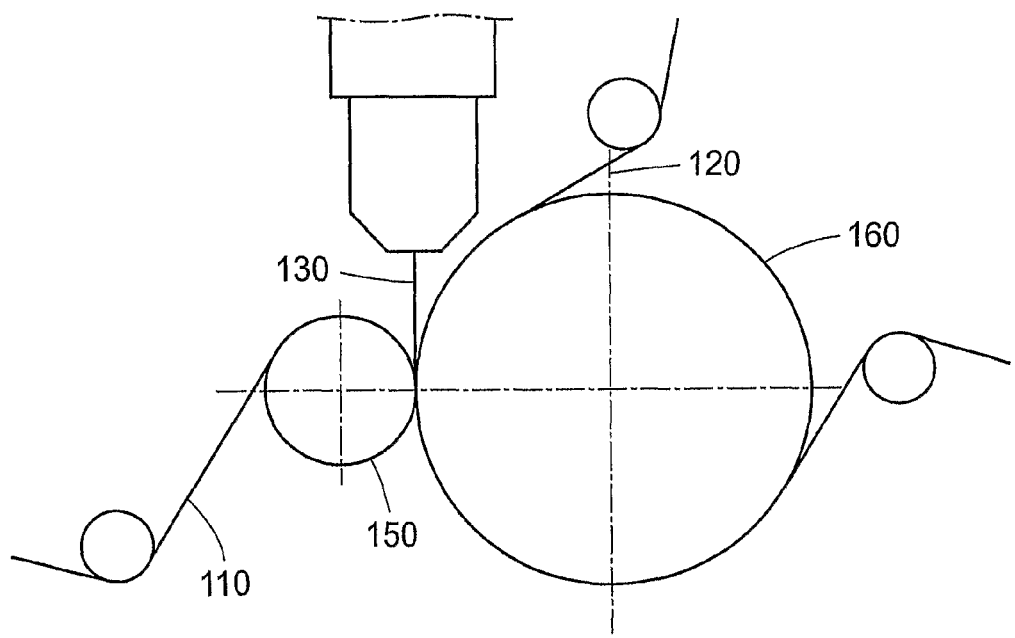
FIG. 1 is a schematic side elevation of a lamination station according to the present invention.
Figure 2:
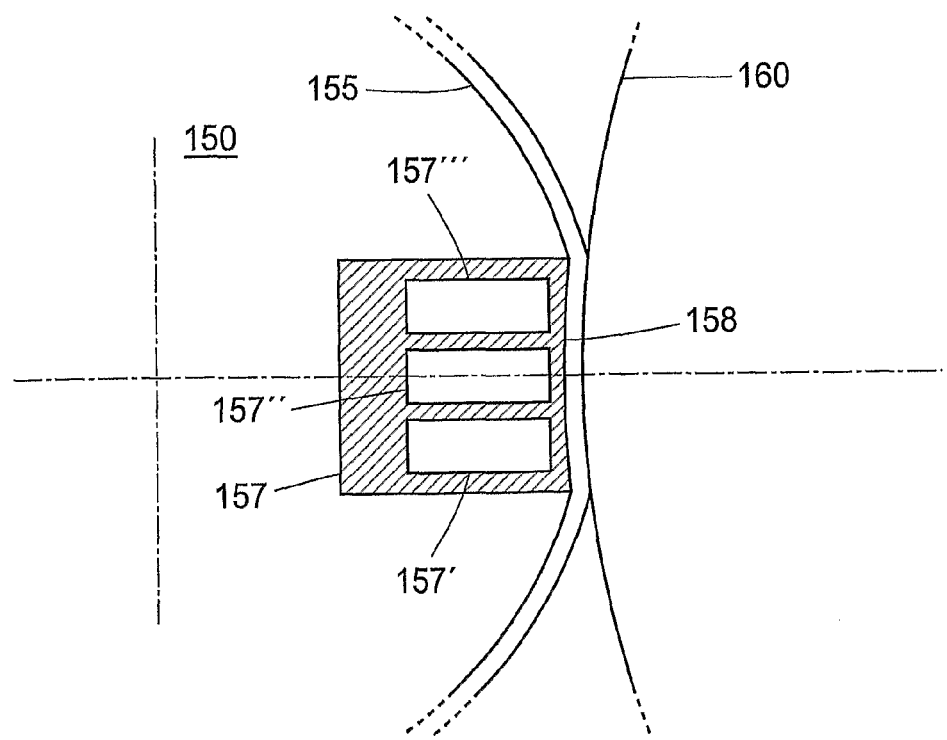
FIG. 2 is a schematic side elevation which shows a nip between a shoe-press type roller and a cooling roller according to one embodiment of the invention.
Figure 3:
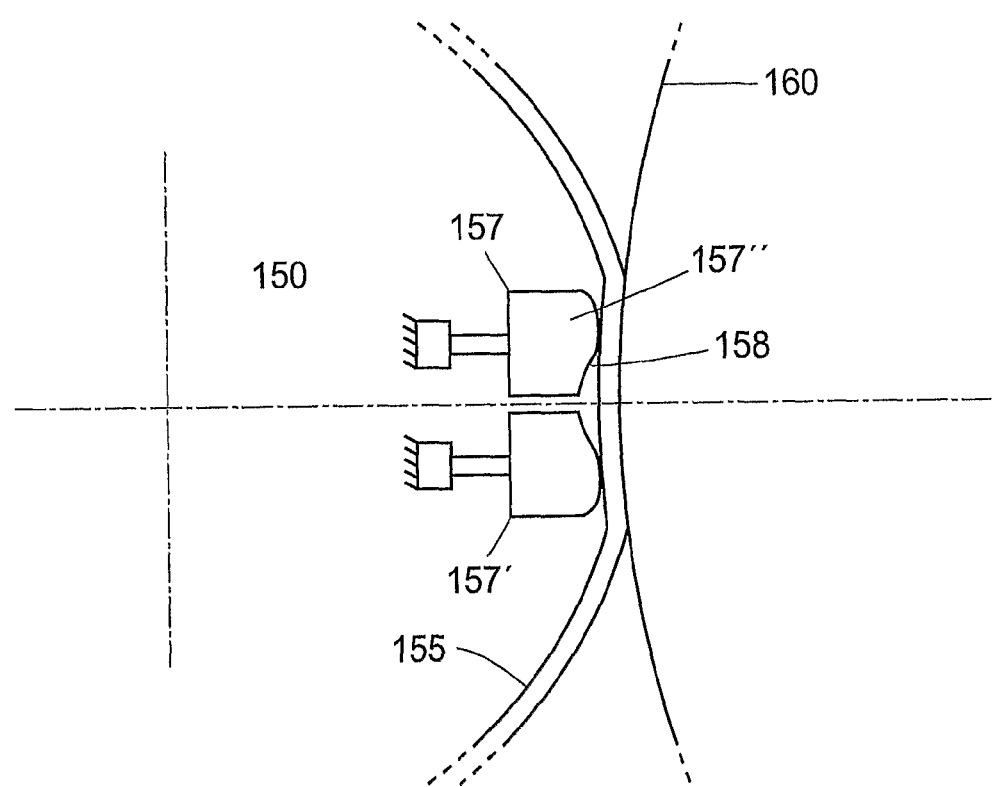
FIG. 3 is a schematic side elevation which shows a nip between a shoe-press type roller and a cooling roller according to an alternative embodiment of the invention.

FIGS. 1, 2 and 3 show a part of a lamination machine intended for coating a web of paperboard 110 with a film 120. In order to fix the film 120 to the paperboard 110, there is provided a thin layer 130 in the form of a molten polymer or an adhesive between the paperboard 110 and the film 120. In order to generate the pressure and temperature reduction requisite for lamination, the paperboard 110, the film 120 and the polymer melt 130 are pressed together between a press or nip roller 150 and a cooling roller 160. That region which is put under pressure between these rollers is generally entitled the nip, and its extent in the longitudinal direction of the web 110 is determined on the one hand by the force between the cooling roller and the nip roller, and on the other hand by how resilient the material in the nip roller and the cooling roller is. Not seldom, the cooling roller 160 is cooled, e.g. by means of an inner water cooling device (not shown).

In another embodiment of the present invention, it is possible to dispense with the thin layer 130 and instead employ a film 120 which is coated with an adhesive or hot melt layer (not shown), this layer facing towards the web of paperboard 110. It is then also possible to obtain in the nip such a pressure and temperature that the film 120 adheres to the paperboard 110 by wholly or partly melting (so-called "hot cylinder lamination").

In lamination machines according to prior art technology, both the cooling roller 160 and the nip roller 150 are largely cylindrical. This entails that the nip will be relatively short, unless a large force urges the rollers together. However, there are a plurality of drawbacks in employing a large force, e.g. that the paperboard 110 will be subjected to a compression which reduces its rigidity or stiffness. The short nip according to the prior art technology entails that the stay-time in the nip will be short, which limits the speed at which the web can pass through the nip. Moreover, the high pressure in the nip makes it difficult to employ economical paperboard types as the paperboard 110, since low price paperboard types generally possess low density, with the result that their tendency to be compressed together by the nip is manifest. If a paperboard is compressed together, its thickness will be reduced and a reduced thickness implies that the rigidity of the material is reduced, which in turn implies that a package manufactured from the material runs the risk of losing its shape.

According to the present invention, the nip roller 150 is a so-called shoe roller; the function of such a shoe roller will be explained hereinbelow with reference to FIG. 2 and FIG. 3.

A nip roller 150 according to one embodiment of the present invention includes a press web 155, which in operation runs at the same speed as the cooling roller 160, the web of paperboard 110 and the film 120. The pressure requisite for the lamination is generated in that the press web 155 is urged by at least one pressure bar 157 against the cooling roller 160. The bar 157 is positioned stationarily in relation to the cooling roller 160, which implies that the press web 155 will slide against a front surface 158 of the bar 157.

By using a nip roller 150 of the shoe roller type, it will be possible to distribute the nip over a greater area, which in turn makes it possible either to increase the lamination speed while maintaining a long press time, or to have a lower pressure and longer press time.

There is a plurality of different types of shoe rollers; a feature common to them however is that they are provided with a press web 155 which has the same speed as a counter roller (according to the present invention a cooling roller) and which slides against a pressure-generating bar provided to create a pressure between the press web 155 and the counter roller. Shoe rollers for the paper industry are commercially available (for example Metso paper Karlstad sells shoe rollers under the trademarks Optidwell and Symbelt). Shoe rollers intended for the paper industry differ however from rollers suitable for lamination in that the shoe rollers suitable for the paper industry give a considerably higher compression pressure; it is not uncommon that the compression pressure within the paper industry is 3 to 4 times higher than that required for lamination.

The pressure bar 157 according to FIG. 2 is provided with a battery, or number, e.g. three, of individually governable pressure elements 157' 157" and 157'". In certain embodiments of the present invention, the pressure elements 157', 157" and 157'" extend throughout the entire length of the shoe roller, with the result that the compression pressure will be uniformly distributed throughout the entire length. In other embodiments, it may be desirable that some of the pressure elements do not extend throughout the entire length, with the result that the nip may be varied over the width of the web.

In this embodiment of the present invention, the pressure elements 157', 157" and 157'" consist of an elongate flexible die having multiple chambers containing a hydraulic liquid, each chamber representing a pressure element. There may be several pressure elements, from 2 up to what is practically feasible, but normally from 2 to 6. The die is pressed against the press web by means of a hydraulic pressure provided beneath the die from the chambers, the force being transferred from the die to the press web 155 and via the web 110 to the cooling roller 160.

The hydraulic pressure also affords the major advantage that the compression pressure will be uniform along the entire width of the web, since the hydraulic pressure equalizes out any possible outward flexing of the nip- and cooling rollers.

According to an alternative embodiment of the present invention, as shown in FIG. 3, multiple press devices 157, 157' (there may be several further press devices, however not shown) are disposed as elongate bars, strips or beads of a rigid material. The bars, strips or beads extend over substantially the entire width of the press web 155 and may be urged against it by means of hydraulic cylinders.

Yet a further advantage inherent in the present invention is that the press web 155 may be coated with a material displaying a certain resilient yieldability, e.g. in order to realise a nip similar to that described in EP 1 345 756. This provides the property that the compression pressure will be more "elastic", which implies that the compression pressure reaches into regions where the paperboard is perforated, in order e.g. to realise an indication for the penetration of a drinking straw.

In both of the above-described embodiments, it is possible to regulate the pressure in the nip during operation, by increasing or reducing the hydraulic pressure.

Yet a further advantage inherent in the present invention is that the long nip between the nip roller and the cooling roller may improve lamination of e.g. porous paperboard or porous plastic layers without at the same time damaging these layers.

What is claimed is:

1. A lamination station for lamination of a film or a material layer to a web of paperboard or cardboard, where the lamination station includes a nip roller and a cooling roller, between which rollers a nip is formed which presses together the material layer or the film and the web of paperboard or cardboard, and the film or the material layer after the nip abuts against the cooling roller during a given angle interval, wherein the nip roller is a shoe-press type roller including at least two individually controllable pressure bars.

2. The lamination station as claimed in claim 1, where an interjacent molten polymer layer or adhesive layer is disposed between the film and the web of paperboard.

3. The lamination station as claimed in claim 1, wherein the film is a polymer film or an aluminium foil.

4. The lamination station as claimed in claim 1, where the material layer is a molten polymer which is applied to the web of paperboard by extrusion coating.

5. The lamination station as claimed in claim 1, where the shoe-press type roller includes a press web, the press web running parallel with and at the same speed as the web of paperboard and the press web being urged against the cooling roller by a bar having pressure elements provided for this purpose.

6. The lamination station as claimed in claim 5, where the pressure elements are hydraulically activated elements.

7. The lamination station as claimed in claim 1, where the shoe-press type roller includes a press web which possesses a width, the press web running parallel with and at the same speed as the web of paperboard and the press web being urged against the cooling roller by the at least two individually controllable pressure bars which are formed of a rigid material extending over substantially the entire width of the press web.

8. Use of a lamination station as claimed in claim 1, for manufacture of packaging material.

9. A lamination system comprising:
a plastic film or metal foil;
a web of paperboard or cardboard;
a rotatable counter roller possessing an outer circumferential surface;
a rotatable shoe-press type roller possessing an outer circumferential surface and positioned in opposition to the counter roller so that a nip exists between the outer circumferential surface of the counter roller and the outer circumferential surface of the shoe-press type roller;
the shoe-press type roller comprising at least two individually controllable pressing bars configured to apply an outwardly directed force urging a portion of the outer circumferential surface of the shoe-press type roller in the nip toward the counter roller; and
the nip being configured to receive the plastic film or metal foil and the web of paperboard or cardboard to press the plastic film or metal foil against the web of paperboard or cardboard to bond the plastic film or metal foil to the web of paperboard or cardboard.

10. The lamination system of claim 9, wherein the plastic film or metal foil covers a portion of the outer circumferential surface of the rotatable counter roller after being received by the nip.

11. The lamination system of claim 9, further comprising a molten polymer layer or adhesive layer, wherein the nip is configured to receive the molten polymer layer or adhesive layer so that the molten polymer layer or adhesive layer is positioned between the plastic film or metal foil and the web of paperboard or cardboard.

12. The lamination system of claim 9, wherein the at least two individually controllable pressing bars are hydraulically actuated to apply the outwardly directed force.

13. The lamination system of claim 9, wherein the shoe-press type roller includes a coating of an elastic material forming the outer circumferential surface of the shoe-press type roller so that the outer circumferential surface of the shoe-press type roller is deformable to extend into perforations of the web of paperboard or cardboard.

* * * * *